INVENTOR.
CLAUDE D. WILSON
By Miketta, Glenny, Poms & Smith
ATTORNEYS.

United States Patent Office 3,456,074
Patented July 15, 1969

3,456,074
IMAGE STABILIZATION OF OPTICAL
IMAGING SYSTEMS
Claude D. Wilson, El Monte, Calif., assignor, by mesne assignments, to Xerox Corporation, a corporation of New York
Filed Nov. 25, 1966, Ser. No. 597,004
Int. Cl. H04n 5/38
U.S. Cl. 178—7.2    17 Claims

ABSTRACT OF THE DISCLOSURE

The present disclosure relates generally to optical imaging systems, and more particularly to control of image smear or blur from vibration of one or more parts of such a system. An example is vibration of the system when it is mounted on a moving vehicle. In the disclosed system, information is sensed relating to the position or displacement of a image tube that views an object while it is vibrating relative to the object. The information is used to repeatedly operate the tube to momentarily display an image of the objct when the image tube is at a particular position or displacement relative to the object.

---

Broadly, optical imaging systems are used to view an object or target and to reproduce for the observer an image or picture of the object. The system may include an image tube or device which directly or indirectly views the object and has an image or display screen on which the image of the object is produced. Such systems find application for example in low or obscured visibliity situations such as caused by low light levels, fog, smoke or the like. Such a system may be subjected to vibration incident to its use as when it is mounted on a vehicle such as a helicopter, tank or missile. The vibration of the vehicle which is picked up by the imaging system may cause image smear or blur or other undesirable distortion of the image. The effectiveness of the imaging system is accordingly impaired or limited.

Various methods are presently being employed in connection with optical imaging systems for image stabilization. These include mechanical damping as with vibration pads, fluid damping, and electro-optical damping using a variable angle prismatic effect. The mechanical and fluid damping systems are limited in their effectiveness and are inadequate for high-accuracy optical imaging systems. Electro-optical damping systems are complicated and costly to manufacture, install and service.

The present invention contemplates controlling the appearance of the image on the image tube of an optical imaging system subject to a vibrational environment to stabilize the image. In the exemplary forms of the system illustrated in the drawings, the image is stabilized by timing pulses of high voltage to the image tube so as to produce a short duration image on the tube each time a particular position or displacement is reached by the vibrating tube. The illustrated systems are adapted to operate with vibrations of various and varying character, with the affect of the specific character of the vibrations being minimized.

It is an object of the present invention to provide a novel and improved method and system for stabilizing the image produced by an optical imaging system subject to vibrations.

It is another object of the present invention to provide such a method and system for correlating the production of the image with the displacement or position of the vibrating system.

It is another object of the present invention to provide such a method and system which is adapted to sense information related to vibrations of varied and varying character.

It is a more particular object of the present invention to provide such a method and system for producing short duration images only when the vibrating system is in a predetermined position or displacement.

It is another object of the present invention to provide such a method and system having means for controlling the time for which each such image remains on the image tube.

It is another object of the present invention to provide such a method and system which may be selectively varied to sense information relating to vibrations in different planes.

It is a further object of the present invention to provide such a method and system adapted to simultaneously sense information related to vibrations in more than one plane.

It is a still further object of the present invention to provide such a method and system which are relatively simple, economical, stable and dependable.

Other objects and advantages of the present invention will become more apparent from the following description and the associated drawings, wherein.

Figure 1:
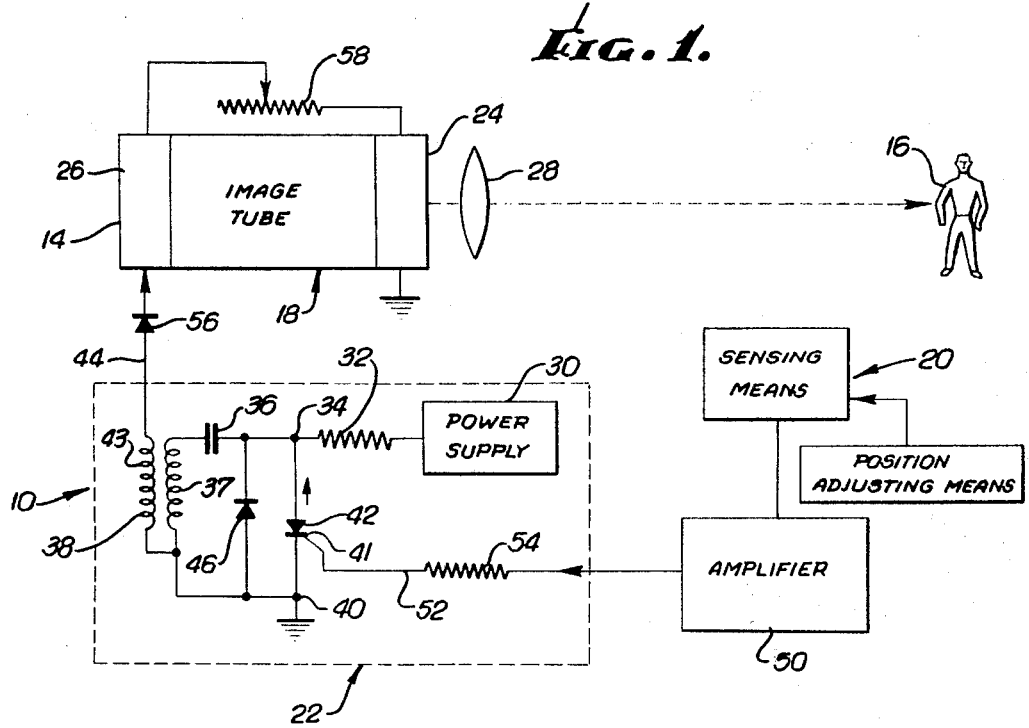
FIG. 1 is a diagrammatic representation of one form of an optical imaging system with image stabilizing means which embodies various features of the present invention, and is operable in accordance with the method of the invention.
Figure 2:
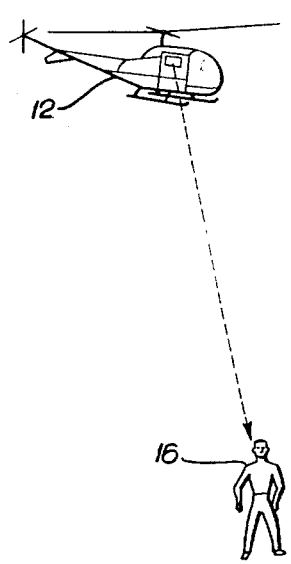
FIG. 2 is a pictorial representation of a helicopter having such a system viewing a man on the ground.

Briefly, an exemplary form of optical imaging system 10 shown in FIGS. 1 and 2 is adapted to be mounted on a vehicle such as a helicopter 12, to view an object 16 outside the vehicle, and to produce for an observer in the vehicle an image of picture 14 that is a reproduction of the object 16. Incident to its normal operation, the vehicle 12 will be subject to vibrations, causing the imaging system 10 to vibrate relative to the object 16. The illustrated system 10 includes image tube 18 which views the object and also upon which the image 14 of the object is displayed. Sensing means 20 senses information related to the position or displacement of the image tube 18 and controls an actuating or high voltage pulse generating means 22 in accordance with the sensed information to deliver pulses to the image tube in correlation with the position or displacement of the image tube. Each pulse produces a momentary image 14 on the tube 18 so that an image is displayed approximately each time a particular position or displacement is reached by the vibrating tube. Since in effect the system is always looking at the object from substantially the same position, image blur or smear due to vibration is effectively minimized, permitting a generally stationary picture or image to be displayed on the image tube.

FIG. 2 illustrates the helicopter 12 in a hovering position observing an object or target 16 on the ground below it by use of the exemplary form of optical imaging system 10 (FIG. 1). The helicopter 12 generates vibrations incident to its movement and also by the operation of its motor. The object or target 16 is outside of the vehicle, and while it may or may not be moving, it may be considered stationary relative to the vibration of the vehicle. The illustrated optical image systems may find applications supported on vibratory devices or structures other than vehicles, although they have particular application in connection with vehicles and will be described in that context as a matter of convenience.

As noted above, the exemplary embodiment of the optical imaging system 10 illustrated diagrammatically in FIG. 1 includes the image tube or means 18 which views the object 16 and also displays the images 14 of the object. The means for viewing the object and the means for displaying the images may be separated or combined in a single device as in the case of the illustrated image tube 18. The image tube 18 may take various selected forms, the one shown in FIG. 1 having a cathode 24 at its forward end which is directed toward the object 16, and an anode 26 at its rearward end comprising an image or display screen on which the image 14 is produced. A suitable lens means or system 28 directs and focuses an image of the object 16 onto the cathode 24 of the tube. The anode 26, which may for example be a phosphorus coated screen, is actuated or energized by high voltage to illuminate and display the image.

In the exemplary embodiment of system 10, the high voltage pulse generator means 22 is connected to the anode 26 of the image tube 18. Each pulse delivered by the generating means 22 momentarily excites or energizes the anode image screen 26 to produce a short duration image or picture 14. The timing of the pulses is controlled by the vibration sensing means 20 as noted above.

The optical imaging system 10 may incorporate any suitable high voltage pulse generating or actuating means. The illustrated generating means 22 includes a power supply 30 feeding through an output resistor 32 to a point 34. Point 34 is in a circuit loop that includes a capacitor 36, primary winding 37 of transformer 38 and switch means such as a silicon controlled rectifier or SCR 42. The circuit is grounded at 40. The illustrated SCR, when triggered by a signal at control element 41, permits current flow in one direction as indicated by an arrow in the drawing. The secondary 43 of tarnsformer 38 is connected through a pulse line 44 and (when desired for reasons later discussed) a diode 56 to the image tube anode 26. A diode 46 is connected across SCR 42, and acts as a voltage clamping means to prevent overvoltage reaching the capacitor 36.

The optical imaging system 10 may also include any suitable sensing means 20 such as an accelerometer which measures vibration acceleration (which is correlated with the position or displacement of the vibrating image tube). Such an accelerometer may be of a type well known in the art (therefore not illustrated in detail) which includes a cantilever beam or arm having a weight mounted at its free end and strain gauges mounted along its length. The strain gauges sense tension and/or compression of the beam and thereby sense the acceleration of the vibration of the system. The vibrations are essentially the same for the various components of the system mounted on the vehicle, which components include the sensing means 20 and the image tube 18. It will be appreciated that not all components of an imaging system need be mounted on a vehicle or need to subject to vibration so long as the device or means which views the object and the sensing means are subject to essentially the same vibration. By suitable circuitry such as is well known in the art, the accelerometer produces a voltage output signal which is proportional to the vibration acceleration. This output signal is amplified by suitable means 50 and fed through an output line 52 and resistor 54 to the control element 41 of the SCR 42.

When the vehicle 12 and thus the image tube 18 and sensing means 20 vibrate, the sensing means 20 produces an output voltage signal which is correlated with the acceleration of the vibration and with the displacement or position of the vibrating tube 18. When the output voltage signal from the sensing means 20 reaches a predetermined value (as for example a particular positive voltage) which indicates a particular position or displacement of the vibrating image tube 18, the SCR 42 is triggered to conduct and the capacitor 36 discharges through primary 37, thus generating a high voltage impulse in secondary 43, which is fed to the image tube anode 26. The pulse may be in the nature of 8 kv. and may provide sufficient voltage for about 1 millisecond to produce and maintain the image 14 on the image tube anode 26 for about that time period.

From the foregoing, it will be understood that operation of the system in accordance with the present invention contemplates that not more than a single voltage pulse in line 44 of sufficient magnitude to form an image on anode 26 may result from a single triggering signal of predetermined value from amplifier 50. The values of the circuit components such as the output resistor 32, the capacitor 36 and the transformer 38 may be selectively chosen to accomplish the foregoing objectives in accordance with principles well known in the art.

As the vibration and the resultant output voltage signal from the sensing means 20 continue, the image tube is operated each time the signal voltage reaches the predetermined positive value (indicating the particular position or displacement of the vibrating image tube).

Since the image tube 8 is in generally the same position each time it views the object, the blurring effect of the vibration is minimized.

In general, the illustrated system senses and responds to the major component of vibration as presented in a predetermined plane. While various other smaller variations may be present, they are generally such that they do not produce a sufficient voltage output signal of the sensing means to trigger the pulse generating means. To a considerable extent the operation of the system accommodates itself to variations or changes in the character of the vibrations.

At vibration frequencies above about 10 cycles per second, the sequence of images appearing on the image tube 18 will appear to the observer as a continuous image. However, in the case of slower frequencies of vibration, particularly of 5 cycles per second or less, the picture or image will appear to flash on and off or flicker. To alleviate this flicker problem, the length of time for which each image remains on image tube anode 26 may be increased. This is achieved in the exemplary system 10 by providing a diode 56 in the pulse line 44 between the high voltage pulse generating means 22 and the image tube 18 to retain the high voltage on the image tube anode 26 after each pulse. A variable resistor 58, which is connected between the anode 26 and the cathode 24 of the image tube, combines with the internal resistance of the image tube circuitry to control the leakage or dissipation of the high voltage from the anode to thereby control the duration of each image.

While the exemplary form of system 10 is particularly adapted to sense and respond to information relating to vibration in a particular plane, it may be desirable to adjustably mount the sensing means 20 by any suitable means (or device) to permit selectively changing such reference plane. This adjustment will depend on the characteristics of the vehicle, operating conditions, and the like.

Figure 3:
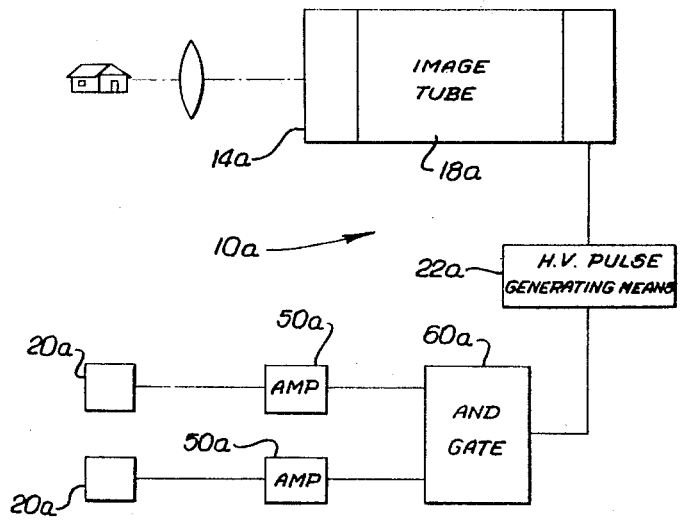
FIG. 3 is a schematic representation of a modified form of optical imaging system.

FIG. 3 illustrates a modified form of optical image system 10a wherein information relating to vibrations in more than one plane is sensed generally simultaneously. The operation of an image tube 18a is controlled by the sensed information to stabilize an image 14a with respect to the two or more aspects of vibration. More particularly, in the illustrated system 10a sensing means are comprised of a pair of accelerometers 20a which each sense information as to the acceleration of the vibrations in different planes. Each of the accelerometers 20a is connected through suitable amplifying means 50a to an AND gate or coordinating means 60a which operates to trigger high voltage pulse generating means 22a only when the voltage output signal from each of the two accelerometers reaches a predetermined value. Thus, the tube 18a is operated to compensate for multiplane vibrations.

Thus, a relatively simple and economical method and system is provided for stabilizing the picture or image produced by an optical imaging system in a vibrational environment by controlling blur or smear often caused by vibration. The method and system are adapted to accommodate vibrations having various and varying characteristics. One illustrated exemplary form of system may be adjusted to selectively control vibrations in different planes and another illustrated form of system is adapted to deal with multi-plane vibrations.

Various modifications and changes may be made in the illustrated structure without departing from the spirit and scope of the present invention.

Various features of the invention are set forth in the following claims.

What is claimed is:

1. An optical imaging system adapted to minimize blur caused by vibration of the system, said system comprising, in combination:
    (a) image means that includes:
        (1) viewing means for observing an object, said viewing means being adapted to be carried on a support that is subject to vibration relative to the object; and
        (2) visual display means operatively associated with said viewing means for displaying an image representing the object as observed by said viewing means;
    (b) actuating means operatively associated with said image means to selectively actuate said image means to momentarily display an image on the display means; and
    (c) sensing means adapted to be carried on said support for sensing information related to the position of said vibrating viewing means, said sensing means being operatively associated with said actuating means for selectively repeatedly operating said actuating means in accordance with said sensed information to actuate said image means to display images.

2. A system as defined in claim 1, wherein said actuating means actuates said display means to display the images.

3. A system as defined in claim 2, wherein said actuating means so actuates said display means by providing high voltage pulses to said display means, said system further including means between said display means and said actuating means for permitting passage of voltage impulses to said display means but limiting return of the voltage from said display means to lengthen the time for which images are displayed on the display means.

4. A system as defined in claim 3, further including variable resistance means connected to the display means so as to selectively control voltage leakage from the display means to thereby control the lengthened durations of said images.

5. A system as defined in claim 1, further including means operatively associated with said image means for lengthening the time for which individual images are displayed on the display means.

6. A system as defined in claim 1, wherein said sensing means comprises accelerometer means for sensing the acceleration of said vibrating viewing means.

7. A system as defined in claim 1, wherein said sensing means includes at least two separate means which each sense information relating to the position of the vibrating viewing means with reference to a different plane, said sensing means also including coordinating means for operating said actuating means to actuate said image means in accordance with the information sensed by both of said separate means.

8. A system as defined in claim 1, wherein said sensing means is adjustable to sense information relating to the position of said vibrating viewing means with reference to different selected planes.

9. For minimizing the effect of vibration on an optical imaging system, the system comprising image means that includes viewing means for observing an object, the viewing means being adapted to be vibrated relative to the object, image means also including a display means which is adapted to display an image representing the object as observed by the viewing means, the combination comprising actuating means operatively associated with the image means to selectively actuate the image means to momentarily display an image on the display means, and sensing means for sensing information related to the position of the vibrating viewing means, said sensing means being operatively associated with said actuating means for selectively repeatedly operating said actuating means in accordance with said sensed information to operate the image means to display images on the display means.

10. A system as defined in claim 9, wherein said sensing means comprises accelerometer means for sensing the acceleration of said vibrating viewing means.

11. A system as defined in claim 9, wherein said sensing means includes at least two separate means which each sense information relating to the position of the vibrating viewing means with reference to a different plane, said sensing means also including coordinating means for operating said actuating means to actuate said image means in accordance with the information sensed by both of said separate means.

12. A system as defined in claim 9, wherein said sensing means is adjustable to sense information relating to the position of said vibrating viewing means with reference to different selected planes.

13. A method for stabilizing the image produced on a display means of an image means of an optical imaging system, the image being a representation of an object observed by a viewing means of the image means, the viewing means being subject to vibration relative to the object, the image means being selectively operable to momentarily display an image on the display means, said method comprising the steps of sensing information relating to the position of the vibrating viewing means, and automatically operating the image means to repeatedly momentarily display images on the display means in accordance with the sensed information.

14. A method as defined in claim 13, wherein the display means is operated to display the images.

15. A method as defined in claim 13, wherein the information sensed is the acceleration of the vibrating viewing means.

16. A method as defined in claim 13, but including the further step of selecting a reference plane in which information related to the position of the vibrating viewing means is sensed.

17. A method as defined in claim 13, wherein information is sensed with reference to two different planes and the image means is operated in accordance with the information sensed with reference to both of said planes.

References Cited

UNITED STATES PATENTS

| | | | |
|---|---|---|---|
| 2,869,803 | 1/1959 | McGee | 178—7.2 |
| 3,161,725 | 12/1964 | Hotham | 178—7.2 |
| 3,293,360 | 12/1966 | Smith | 178—6.8 |
| 3,371,161 | 2/1968 | Crovella | 178—7.2 |

RICHARD MURRAY, Primary Examiner

JOHN MARTIN, Assistant Examiner